United States Patent
Matsumoto et al.

(10) Patent No.: US 7,808,741 B2
(45) Date of Patent: Oct. 5, 2010

(54) HEAD SLIDER AND DISK DRIVE DEVICE

(75) Inventors: Tsuyoshi Matsumoto, Kanagawa (JP);
Futoshi Kitaizumi, Kanagawa (JP);
Yoshio Yamamoto, Tokyo (JP);
Hidetsugu Tanaka, Kanagawa (JP);
Masayuki Ishikawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/313,610

(22) Filed: Nov. 21, 2008

(65) Prior Publication Data

US 2009/0168248 A1 Jul. 2, 2009

(30) Foreign Application Priority Data

Dec. 26, 2007 (JP) .............................. 2007-333636

(51) Int. Cl.
*G11B 5/60* (2006.01)
*G11B 21/21* (2006.01)
(52) U.S. Cl. ....................................................... 360/75
(58) Field of Classification Search ........................ None
See application file for complete search history.

(56) References Cited

U.S. PATENT DOCUMENTS

| 6,992,865 | B2 * | 1/2006 | Thurn et al. ............. 360/294.7 |
| 7,042,674 | B1 | 5/2006 | Baril et al. |
| 7,274,538 | B2 * | 9/2007 | Thurn et al. ............. 360/294.7 |
| 7,277,251 | B2 | 10/2007 | Ishii et al. |
| 7,593,183 | B2 * | 9/2009 | Hsiao et al. ............. 360/123.09 |
| 2007/0058280 | A1 | 3/2007 | Wada et al. |
| 2007/0133118 | A1 * | 6/2007 | Kajitani ........................ 360/75 |
| 2007/0195449 | A1 * | 8/2007 | Feist et al. ..................... 360/75 |
| 2008/0100965 | A1 * | 5/2008 | Oki ......................... 360/234.3 |
| 2009/0040659 | A1 * | 2/2009 | Nakamura et al. ........ 360/234.3 |

\* cited by examiner

*Primary Examiner*—Hoa T Nguyen
*Assistant Examiner*—James L Habermehl
(74) *Attorney, Agent, or Firm*—Mahamedi Paradice Kreisman LLP; Christopher J. Brokaw

(57) ABSTRACT

Embodiments of the present invention help to adjust the recess depth of a head element portion of a head slider. In an embodiment of the present invention, in a test step in manufacturing an HDD, the HDD examines the recess depth of a head element portion and decreases and adjusts the recess depth if the recess depth of the head element portion does not satisfy the predetermined condition. The HDD moves an actuator to a ramp of a retract position and supplies power to a heater in a head slider. If the heater power is large, the head element portion undergoes plastic deformation. The plastic deformation of the head element portion decreases the recess depth of the head element portion.

18 Claims, 10 Drawing Sheets

Delta PTR vs TFC Power

Time vs Delta PTR (a)

Time vs TFC Power (b)

HEAD SLIDER AND DISK DRIVE DEVICE

CROSS-REFERENCE TO RELATED APPLICATION

The instant nonprovisional patent application claims priority to Japanese Patent Application No. 2007-333636 filed Dec. 26, 2007 and which is incorporated by reference in its entirety herein for all purposes.

BACKGROUND OF THE INVENTION

Disk drive devices using various kinds of disks, such as optical disks, magneto-optical disks, flexible magnetic disks, and the like, have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like, in addition to the computers, due to their outstanding characteristics.

A magnetic disk used in a HDD has multiple concentric data tracks and servo tracks. Each servo track is constituted by a plurality of servo data containing address information. Each data track includes multiple data sectors containing user data recorded thereon. Data sectors are recorded between servo data located discretely in the circumferential direction. A head element portion of a head slider supported by a swing actuator accesses a desired data sector in accordance with address information in the servo data to write data to and retrieve data from the data sector.

In order to increase recording density of a magnetic disk, it is important to decrease the clearance between the head element portion flying over the magnetic disk and the magnetic disk and to decrease the variation of the clearance; some mechanisms have been proposed to control the clearance. One of such mechanisms has a heater which heats the head element portion to adjust the clearance in a head slider (for example, refer to Japanese Patent Publication No. 2007-80409 "Patent Document 1"). In the present specification, it is called thermal fly-height control (TFC). The TFC generates heat by applying electric current to the heater to make the head element portion protrude by thermal expansion. This reduces the clearance between the magnetic disk and the head element portion.

The TFC adjusts the protruding amount of a head element portion by controlling the heat generation amount of a heater. A clearance is a spacing between the head element portion and a magnetic disk; the relationship between the heater power and the clearance depends on the shape of the head element portion at a heater OFF state. Specifically, a clearance varies depending on the initial position of the end surface of the head element portion facing the magnetic disk even if the protruding amounts are the same. For precise clearance control, it is demanded to supply heater power depending on the initial shape (the shape at the heater OFF) of the head element portion.

Typically, a head element portion on a head slider is recessed from the air bearing surface (ABS) of a slider. The distance between the ABS and the initial position of the end surface of the head element portion facing the magnetic disk is called a recess depth. The recess depth is defined by grinding and etching steps in manufacturing a head slider. Accordingly, variations in recess depth among head sliders cannot be eliminated. Besides, the head slider is bonded to an actuator and mounted in an HDD. There exists fabrication tolerance in fabricating an HDD, and variations in the fly-height is different in each head slider.

Since the TFC can adjust the clearance (protruding amount of the head element portion) for each head slider, it can reduce variations in recess depth and fly-height of slider to perform appropriate clearance control for each head slider. However, if the recess depth is too large or the initial clearance (the sum of the fly-height of a slider and the recess depth) of a head slider mounted on an HDD is too large, the heater power to be applied for attaining a desired clearance becomes too much to perform accurate clearance control.

In a typical HDD, the maximum heater power value in TFC is specified in order to prevent damage onto the head element portion. That is, the protruding amount of the head element portion using a heater is limited. Therefore, if the recess depth or the initial clearance of head slider is large, sufficiently small clearance cannot be attained so that an accurate read/write operation may not be able to be performed. Consequently, a technique has been demanded that can adjust a recess depth to a smaller depth if the recess depth of a head slider is too large.

BRIEF SUMMARY OF THE INVENTION

Embodiments of the present invention help to adjust the recess depth of a head element portion of a head slider. In the embodiment of FIG. 2, in a test step in manufacturing an HDD, the HDD examines the recess depth of a head element portion 122 and decreases and adjusts the recess depth if the recess depth of the head element portion 122 does not satisfy the predetermined condition. The HDD moves an actuator to a ramp of a retract position and supplies power to a heater in a head slider 12. If the heater power is large, the head element portion 122 undergoes plastic deformation. The plastic deformation of the head element portion 122 decreases the recess depth of the head element portion 122.

DETAILED DESCRIPTION OF THE INVENTION

Figure 1:
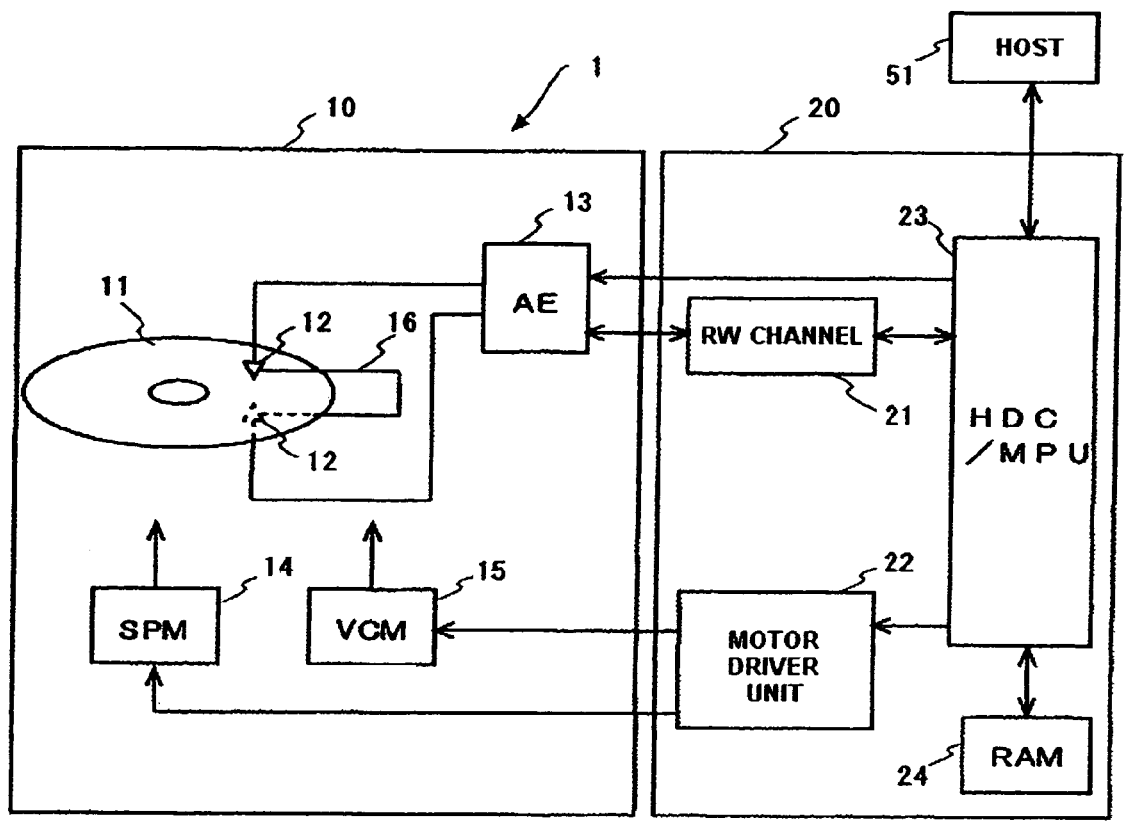
FIG. 1 is a block diagram schematically depicting an entire configuration of an HDD in one embodiment.

Embodiments of the present invention relate to a method for adjusting a recess depth of a head slider and a disk drive device, more particularly, to adjustment of a recess depth of a head element portion in a head slider having a heater for adjusting a protruding amount of the head element portion.

An aspect of embodiments of the present invention supplies power to a heater in a head slider having a slider and a head element portion formed on a trailing-side end surface of the slider and including the heater, expands the head element portion by heat from the heater to which the power has been supplied, and decreases a recess depth of the head slider by plastic deformation of the head element portion induced by the expansion to adjust the recess depth. This accomplishes precise adjustment of the recess depth. The heater may adjust a protruding amount of the head element portion at the time of an access. This accomplishes precise adjustment of the recess depth without an additional heater for adjusting the recess depth. An aspect of embodiments of the present invention determines whether or not the head element portion satisfies a preset condition, and decreases the recess depth by the plastic deformation to adjust the recess depth as needed if the recess depth does not satisfy the preset condition.

In a disk drive device, the power may be supplied to an unloaded head slider to cause plastic deformation of the head element portion. This enables the recess depth to be adjusted with safer and smaller heater power. In addition, the preset condition is a condition that an initial clearance between the head element portion and a disk is smaller than a threshold in the disk drive device. This allows setting the clearance at an appropriate value. The preset condition is a condition that contact between the head slider and the disk is detected at a preset heater power value in a test of the disk drive device. This accomplishes appropriate clearance adjustment by heater power.

Power for the plastic deformation is supplied so that an initial clearance between the head element portion and the disk after adjusting the recess depth becomes larger than a reference value. This prevents degradation in reliability of a head slider. The reference value can be a preset nominal value or a preset lower limit value.

In one example, the recess depth of the head slider is adjusted before mounting the head slider on a disk drive device. This improves manufacturing yield of head sliders or components including head sliders, or enables the recess depth to be an appropriate value in manufacturing a head slider or a component including a head slider.

A heater power value may be selected from a plurality of preset heater power values and supplied; the selected heater power value is the largest heater power of the heater power values at which the variation in the protruding amount per supply time around the adjustment amount is within a specific range. This accomplishes efficient adjustment of the recess depth.

In an example, a plastic deformation amount is varied in accordance with a clearance between the head element portion and the disk before the plastic deformation, and the power is increased with increase in the plastic deformation amount. This accomplishes more appropriate clearance adjustment by a heater at an access.

A disk drive device according to another aspect of embodiments of the present invention comprises a head slider comprising a slider and a head element portion formed on a trailing-side end surface of the slider and including a heater for adjusting protruding amount of the head element portion at a time of an access, a moving mechanism for supporting the head slider and moving the head slider above a disk, a ramp being a retract position of the moving mechanism, and a controller for controlling heater power supplied to the heater when the moving mechanism is on the ramp so that the head element portion undergoes plastic deformation. This enables the recess depth to be precisely adjusted with safer and smaller heater power.

A head slider according to yet another aspect of embodiments of the present invention comprises a slider, and a head element portion formed on a trailing-side end surface of the slider and including a heater for adjusting protruding amount of the head element portion at a time of an access, and a protruding part on an air bearing surface of the slider in a vicinity of the surface on which the slider contacts the head element portion.

According to embodiments of the present invention, a recess depth of a head slider can be adjusted to an appropriate value.

Hereinafter, particular embodiments to which the present invention has been applied will be described. For clarity of explanation, the following description and the accompanying drawings contain omissions and simplifications as appropriate. Throughout the drawings, like components are denoted by like reference numerals, and their repetitive description is omitted if not necessary for clarity of explanation. Hereinafter, embodiments of the present invention will be described by way of example of a hard disk drive (HDD), which is an example of a disk drive device.

An HDD according to one embodiment adjusts the clearance between a head element portion and a magnetic disk of an example of a disk by means of thermal fly-height control (TFC). In the present specification, a clearance is the distance between a head element portion and a magnetic disk. The TFC adjusts the clearance by thermal expansion of the head element portion induced by heat from a heater on a slider. A feature of the present embodiment is adjusting a recess depth of a head slider mounted on an HDD to perform TFC. The recess depth is the distance between the air bearing surface (ABS) of a slider and the initial position of the end surface of the head element portion facing the magnetic disk as described above. The initial position is the position before the TFC starts to supply heater power.

In one aspect, in a test step in manufacturing an HDD, the HDD examines the recess depth of a head element portion and reduces the recess depth to adjust it if the recess depth of the head element portion does not satisfy the predetermined condition. Specifically, it reduces the recess depth if the clearance between the head element portion and the magnetic disk is larger than a threshold. The HDD can measure the clearance at the heater OFF by changing the clearance with changing heater power. The HDD moves an actuator to a ramp, a retract position, and supplies power to the heater in the head slider. If the heater power is large, the head element portion undergoes plastic deformation. The plastic deformation of the head element portion decreases the recess depth of the head element portion.

Before describing details of adjusting the recess depth according to an embodiment, an entire configuration of an HDD will be outlined. FIG. 1 is a block diagram schematically depicting an entire configuration of an HDD 1. The HDD 1 comprises a magnetic disk 11, a disk for storing data, inside an enclosure 10. A spindle motor (SPM) 14 rotates the magnetic disk 11 at a specific angular rate. Head sliders 12 are provided to access (read or write) the magnetic disk 11; each of them corresponds to each recording surface of the magnetic disk 11. Access is a broader concept comprising read and write. Each head slider 12 comprises a slider for flying over the magnetic disk and a head element portion fixed on a slider for converting magnetic signals to and from electric signals.

Each of the head sliders 12 according to the present embodiment comprises a heater for the TFC to make the head element portion expand and protrude by heat and adjust the clearance (fly-height) between the head element portion and the magnetic disk 11. Another heater is not necessary if the heater for the TFC is used as a heater to cause plastic deformation of the head element portion. The structure of a head slider 12 will be described later in detail referring to FIG. 2. The head sliders 12 are fixed to a tip end of an actuator 16. The actuator 16, which is coupled to a voice coil motor (VCM) 15, pivots about a pivotal shaft to move the head sliders 12 above the rotating magnetic disk 11 in its radial direction. The actuator 16 and the VCM 15 are moving mechanisms of the head sliders 12.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic disk 11 from multiple head sliders 12, amplifies reproduction signals therefrom to send them to a read-write channel (RW channel) 21. Further, it sends recording signals from the RW channel 21 to the selected head slider 12. The AE 13 further supplies the heater of the selected head slider 12 with electric power and functions as an adjusting circuit for adjusting the electric energy.

The RW channel 21, in a read operation, amplifies read signals supplied from the AE 13 to have specific amplitudes, extracts data from the obtained read signals, and performs a decoding process. The retrieved data includes user data and servo data. The decoded read user data and servo data are supplied to the HDC/MPU 23 The RW channel 21, in a write operation, code-modulates write data supplied from the HDC/MPU 23, converts the code-modulated write data into write signals, and then supplies them to the AE 13.

The HDC/MPU 23, an example of a controller, performs entire control of the HDD 1 in addition to necessary processes concerning data processing such as read/write operation control, command execution order management, positioning control of the head sliders 12 using servo signals (servo control), interface control to and from a host 51, defect management, and error handling operations when any error has occurred. In addition, the HDC/MPU 23 controls the AE 13 to adjust the clearance by the TFC.

Figure 2:
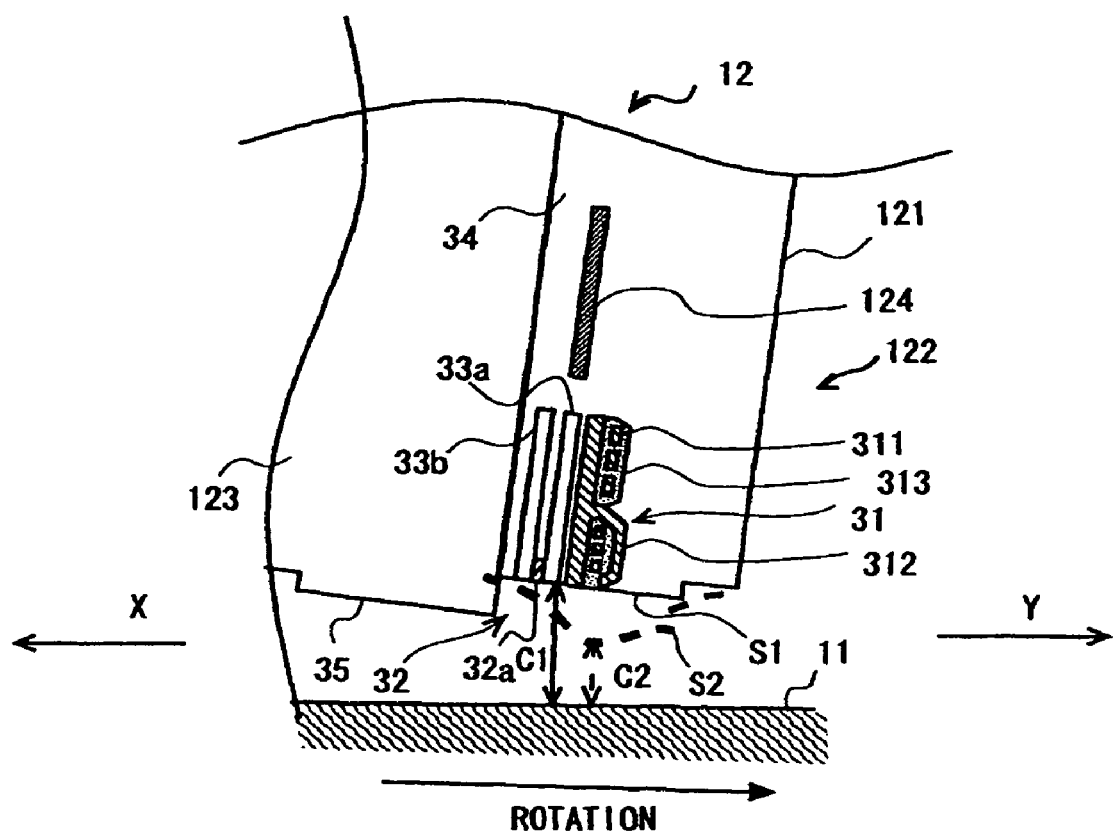
FIG. 2 is a cross-sectional view schematically illustrating a configuration of a head slider having a heater for TFC in the present embodiment.

FIG. 2 is a cross-sectional view illustrating a configuration in the vicinity of an air flowing end surface (trailing side end surface) 121 of a head slider 12. The Y direction in FIG. 2 is called a trailing direction, and the X direction is called a leading direction. A surface of a slider 123 facing a magnetic disk is an air bearing surface (ABS) 35; the pressure by air between the ABS 35 and the magnetic disk 11 balances the pressing force of the actuator 16 for the head slider 12 to fly above the magnetic disk 11. A slider 123 supports a head element portion 122. The head element portion 122 comprises a read element 32 and a write element 31. In FIG. 2, the write element 31 generates magnetic fields between magnetic poles 312 by means of electric current flowing across a write coil 311 to write magnetic data onto the magnetic disk 11. The read element 32 has a magnetoresistive element 32a having magnetic anisotropy and retrieves magnetic data by means of resistance varying with magnetic fields from the magnetic disk 11.

The head element portion 122 is formed on an AlTiC substrate constituting the slider 123 by a thin film deposition process. The magnetoresistive element 32a is sandwiched between magnetic shields 33a and 33b. The write coil 311 is surrounded by an insulating film 313. A protective film 34 made of alumina or the like is formed around the write element 31 and the read element 32. A heater 124 is present in the vicinity of the write element 31 and the read element 32. The heater 124 can be formed by winding a thin film resistive element using permalloy or the like and filling the gap with alumina.

When the AE 13 supplies the heater 124 with electric current, the vicinity of the head element portion 122 is deformed to protrude due to the heat of the heater 124. For example, in a heater OFF state (a state that heater power is not supplied to the head), the shape of the end surface of the head slider 12 facing the magnetic disk is indicated by S1, and the clearance which is the distance between the head element portion 122 and the magnetic disk is indicated by C1. C1 is called an initial clearance. The protruding shape S2 in heating the heater 124 is indicated by a dashed line. The head element portion 122 comes close to the magnetic disk 11 and the clearance C2 at this time is smaller than the clearance C1. FIG. 2 is a conceptual view and its dimensions are not rigidly defined. The protruding amount of the head element portion 122 and the clearance vary in accordance with the heater power value supplied to the heater 124.

The HDC/MPU 23 uses the heater power value at which the magnetic disk 11 contacts the head slider 12 in determining the heater power for a read/write operation of user data. The clearance is a spacing between the head element portion 122 and the magnetic disk 11. Accordingly, the difference between the current heater power and the heater power at which contact occurs defines the clearance. Specifically, the heater power P which the HDC/MPU 23 applies to the heater 124 by controlling the AE 13 satisfies the following relationship:

$$P = (TDP \times \text{eff [BASE]} - \text{Target} - dt \times t\_comp - dp \times p\_comp)/\text{eff}.$$

In the above formula, eff represents a current heater power efficiency; eff[BASE] represents the heater power efficiency under the reference condition. TDP represents the heater power at which a head slider 12 contacts a magnetic disk 11 under the reference condition; Target, a target clearance; dt, the difference in temperature from the reference condition; t_comp, a clearance variation rate for the temperature; dp, the difference in barometric pressure from the reference condition; and p_comp, a clearance variation rate for the barometric pressure. That is, the third term is a correction value for temperature change and the fourth term is a correction value for pressure change.

An HDD 1 determines TDP of each head slider 12 by measurement in a test step in manufacturing the HDD 1. Therefore, the above-mentioned reference condition is a condition in measuring the TDP; typically, the reference temperature is a room temperature and the reference pressure is 1 atom. The TFC depending on the pressure is especially advantageous when the clearance is small and finer clearance adjustment is required. The HDC/MPU 23 determines the plurality of values by measurement in the test step.

Figure 3:
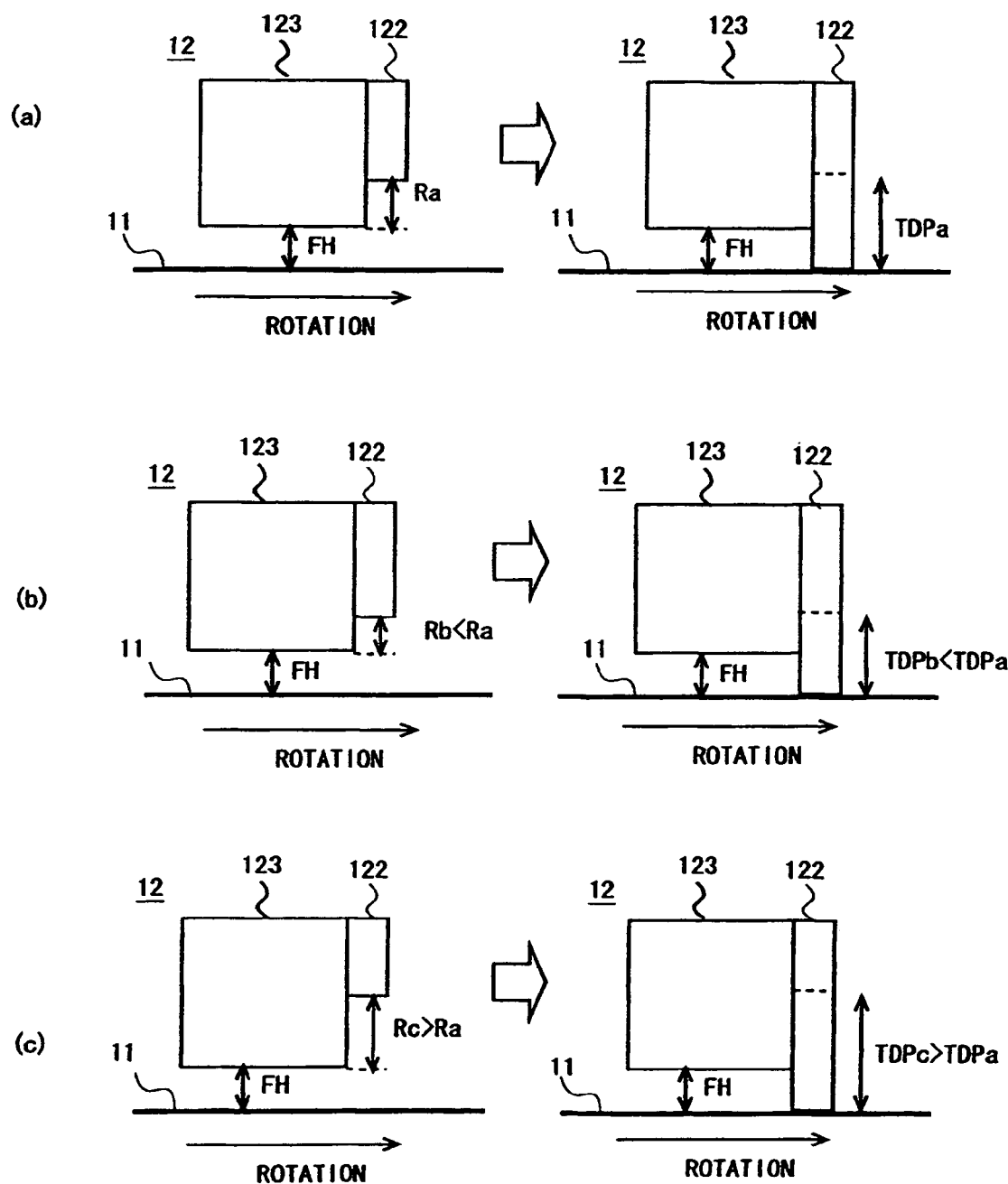
FIGS. 3(*a*)-3(*c*) schematically depict different head sliders in one embodiment.

Each head slider 12 has a different TDP which varies depending on the recess depth of its head element portion 122 and the fly-height of the slider 123. Each of FIGS. 3(a) to 3(c) schematically illustrates a different head slider 12. For example, the head slider 12 exemplified in FIG. 3(a) has a fly-height FH of the slider 123 and a recess depth Ra. At a heater power TDPa, the head slider 12 contacts the magnetic disk 11. The recess depth is a distance between the ABS 35 of the slider 123 and the end surface of the head element portion 122 facing the magnetic disk.

The head slider 12 exemplified in FIG. 3(b) has the same slider fly-height FH as the example of FIG. 3(a), but the recess depth Rb is smaller than the recess depth Ra. That is, the initial clearance (clearance at the heater OFF) in FIG. 3(b) is smaller than the initial clearance in FIG. 3(a). Accordingly, the heater power TDPb at which the head slider 12 contacts the magnetic disk 11 is smaller than TDPa.

On the other hand, the head slider 12 exemplified in FIG. 3(c) has the same slider fly-height FH as the example in FIG. 3(a), but the recess depth Rc is larger than the recess depth Ra. That is, the initial clearance in FIG. 3(c) is larger than the initial clearance in FIG. 3(a). The heater power TDPc at which the head slider 12 contacts the magnetic disk 11 is larger than TDPa.

In this way, the heater power at which a head slider 12 (head element portion 122) contacts a magnetic disk 11 is different in each head slider 12. The HDC/MPU 23 adjusts the heater power to determine the contact heater power of each head slider 12 by measurement. Some methods for detecting head-disk contact have been known. For example, the HDC/MPU 23 measures amplitudes of read signals, VCM current values, SPM current values, or the like to detect head-disk contact.

In order to prevent the head element portion 122 from being damaged due to heat by the heater 124, heater power allowed for the HDC/MPU 23 to apply to the heater 124 has been specified. If the initial clearance of the head slider 12 is large, the head slider 12 sometimes does not contact the magnetic disk 11 even at the maximum heater power Pmax. Namely, if the initial clearance is larger than the clearance expressed by Pmax, the head slider 12 does not contact the magnetic disk 11.

Figure 4:
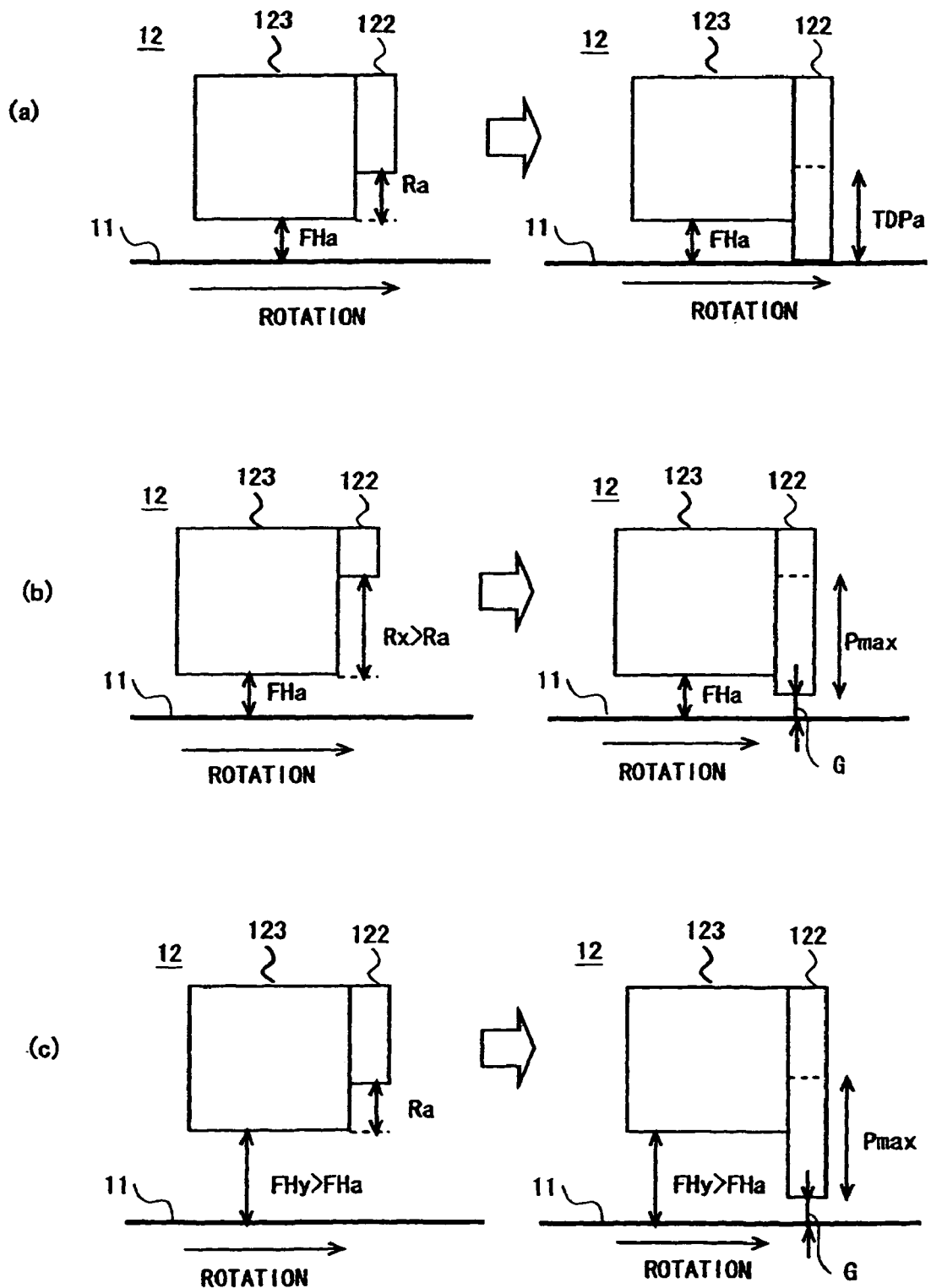
FIGS. 4(*a*)-4(*c*) schematically depict examples in which a head element portion does not contact a magnetic disk at the maximum heater power in one embodiment.

For example, it is assumed that, as shown in FIG. 4(a), if a heater power TDPa is applied to a head slider 12 with the slider fly-height FHa and the recess depth Ra, the head slider 12 contacts the magnetic disk 11. If the recess depth Rx is large like in the head slider 12 in FIG. 4(b), the head element portion 122 does not contact the magnetic disk 11 but a gap G is present therebetween at the maximum heater power Pmax even if the slider fly-height is FHa.

Or, like in the head slider 12 in FIG. 4(c), if the slider fly-height FHy is large, the head element portion 122 does not contact the magnetic disk 11 but a gap G is present at the maximum heater power Pmax even if the recess depth is Ra. Although not shown in the drawings, even if the slider fly-height and the recess depth are not independently so large, the head element portion 122 does not contact the magnetic disk 11 at the maximum heater power Pmax if their sum is large.

If the HDC/MPU 23 according to an embodiment does not detect contact in measuring TDP, namely, if the initial clearance is larger than the clearance at a threshold of Pmax, it adjusts the recess depth of the head element portion 122 to a smaller value. Decreasing the recess depth so that the head element portion 122 will contact the magnetic disk 11 allows measurement of TDP to accomplish accurate TFC based on the measured TDP.

As described above, the initial clearance is defined mainly by the recess depth and the slider fly-height. Therefore, even if the recess depth is a normal value, the head element portion 122 may not contact the magnetic disk 11 due to a large slider fly-height. If the head element portion 122 does not contact the magnetic disk 11 at the maximum heater power, the fly-height of the head slider 12 is too high or the recess depth with respect to the fly-height is too large.

Figure 5:
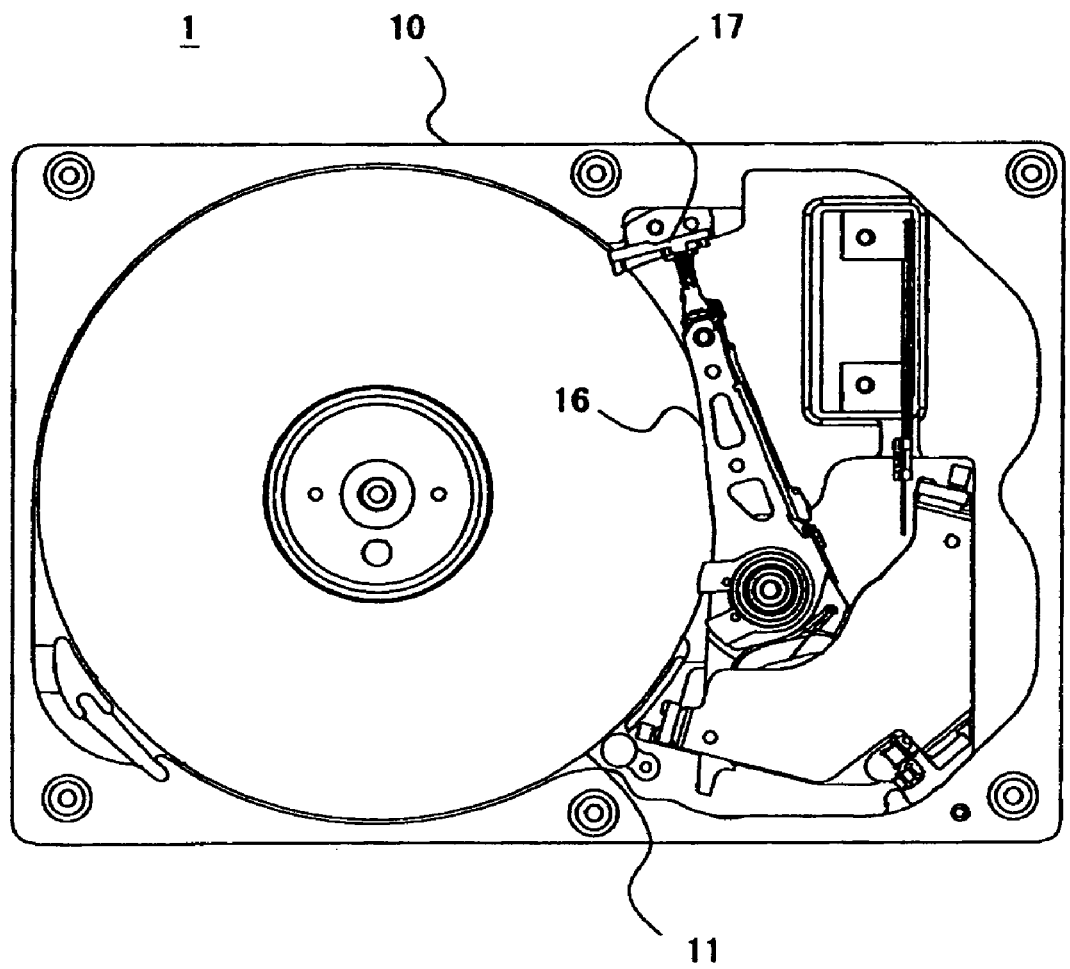
FIG. 5 shows an actuator stopping at a waiting position of a ramp 17 in an embodiment.

In order to adjust the recess depth of the head element portion 122, the HDC/MPU 23 moves (unloads) the actuator 16 to a ramp of the retract position and stops it at a waiting position on the ramp. The state that a head slider 12 stays at the waiting position on the ramp is called an unloaded state. FIG. 5 illustrates an actuator 16 which stays at a waiting position on a ramp 17. The actuator 16 swings about a swing shaft to move a head slider 12 in the radial direction of a magnetic disk 11.

The ramp 17 is provided at a vicinity of the outer circumferential end of the magnetic disk 11. The actuator 16 stays at a parking position on the ramp 17 during idling or non-operation. When the actuator 16 is at the waiting position, the head slider 12 is not located above the magnetic disk but at a position away from the magnetic disk 11. When the actuator 16 is at the waiting position, the head slider 12 is outside of the magnetic disk 11 and the head slider 12 does not overlap the magnetic disk 11 viewed in the direction of the rotational axis of the SPM 14.

The HDC/MPU 23 controls an AE 13 to supply heater power to the head slider 12 at the waiting position. When the head slider 12 is positioned at the waiting position, the heater power sensitivity of the head element portion 122 is larger than the one during flying over the magnetic disk 11. That is, if the same heater power is applied, the protruding amount of the head element portion 122 when the head slider 12 stays at the waiting position is larger than the one when the head slider 12 is flying over the magnetic disk 11.

When the head slider 12 is flying over the magnetic disk 11, the heat of the heater 124 is escaped to the magnetic disk 11 and the temperature increase at the head element portion 122 is limited. On the contrary, the temperature and the protruding amount of the head element portion increase more when the head slider 12 stays at the waiting position than when the head slider is above the magnetic disk 11 because the heat does not escape to the magnetic disk 11. Then, the recess depth can be efficiently adjusted with safer and smaller heater power.

Figure 6:
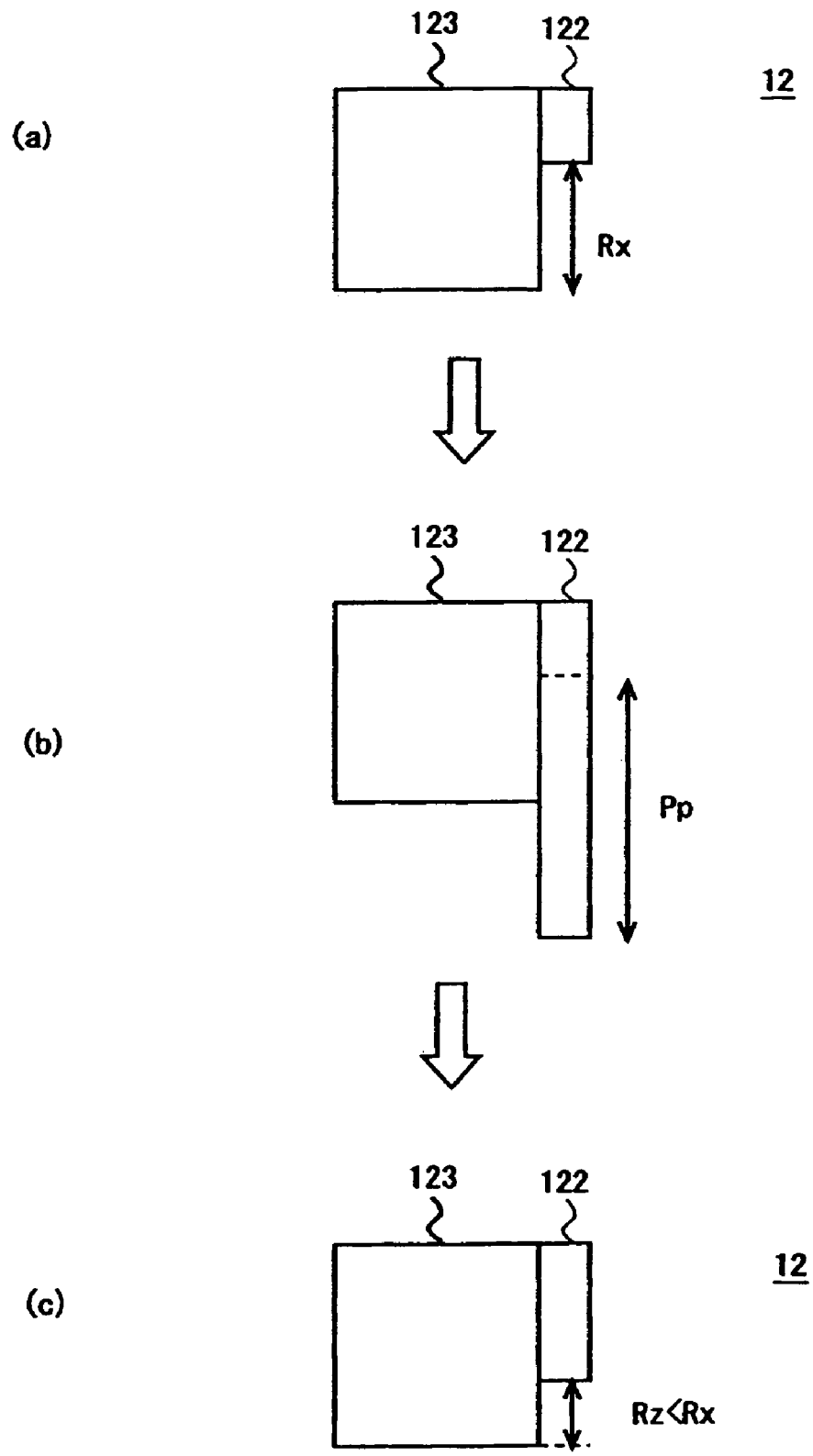
FIGS. 6(*a*)-6(*c*) schematically depict plastic deformation of a head element portion due to heat of a heater in one embodiment.

The HDC/MPU 23 applies specific heater power to a head slider 12 at the waiting position for the head element portion 122 to undergo plastic deformation (irreversible transformation). This results in reduction in the recess depth of the head element portion 122. FIGS. 6(a) to 6(c) schematically illustrate the plastic deformation of the head element portion 122 induced by heat from the heater 124. As shown in FIG. 6(a), the head element portion 122 has an initial recess depth Rx. As shown in FIG. 6(b), the HDC/MPU 23 applies heater power Pp to the heater 124 to make the head element portion 122 protrude.

If the protruding amount of the head element portion 122 exceeds a threshold value significantly, the head element portion undergoes plastic deformation. Therefore, when the heater 124 is turned off from the state that the heater power Pp is being applied, the head element portion 122 contracts, but the contraction amount is smaller than the protruding amount at the heater power Pp. Accordingly, as shown in FIG. 6(c), the recess depth Rz of the head element portion 122 after the plastic deformation becomes smaller than the initial recess depth Rx In this way, heating the head element portion 122 using the heater 124 on the ramp 17 can cause great deformation of the head element portion 122; the plastic deformation allows to adjust the recess depth.

Now referring to the flowchart of FIG. 7, an example of adjusting the recess depth of a head element portion 122 in measuring TDP will be described. The HDC/MPU 23 increases heater power of a head slider 12 step by step in order to measure TDP. If contact between the head slider 12 and the magnetic disk 11 has not been detected, the HDC/MPU 23 applies the preset maximum heater power Pmax (S11). If contact has been detected at the maximum heater power Pmax (Y in S12), the HDC/MPU 23 determines that the heater power Pmax is the TDP.

If contact has not been detected at the maximum heater power Pmax (N in S12), the HDC/MPU 23 determines that the clearance is over the threshold and adjusts the recess depth. Therefore, whether or not the initial clearance is larger than the threshold is one of the specified conditions for determining whether or not to perform the control according to the present embodiment. Specifically, the HDC/MPU 23 unloads the actuator 16 to move it to the waiting position on the ramp 17 (S13) by controlling the VCM 15 through the motor driver unit 22. The HDC/MPU 23 sets data indicating heater power to the register in the AE 13, and the AE 13 supplies heater power to the head slider 12 according to the data (S14). The heater power is large enough to induce plastic deformation of the head element portion 122. This decreases the recess depth of the head element portion 122.

The HDC/MPU 23 stops supplying the heater power, loads the actuator 16 (head slider 12) from the ramp 17 to the magnetic disk 11 (S15), and measures the TDP again (S16). If contact between the head element portion 122 and the magnetic disk 11 has been detected in remeasurement of the TDP (Y in S17), the HDC/MPU 23 determines that the heater power is the TDP.

If contact has not been detected at the maximum heater power Pmax in the remeasurement of the TDP (N in S17), the HDC/MPU 23 checks whether or not the number of times of plastic deformation up to that time reaches the predetermined N times (S18). If the number of times of plastic deformation is less than N times (N in S18), the HDC/MPU 23 repeats adjusting the recess depth and measuring the TDP (S14 to S17). If the number of times of plastic deformation has reached N times (Y in S18), the HDC/MPU 23 stops measuring the TDP. If the head slider 12 has not contacted the magnetic disk 11 through the predetermined number of times of adjusting the recess depth, the head slider 12 more likely has an unrecoverable defect in its structure.

Figure 8:
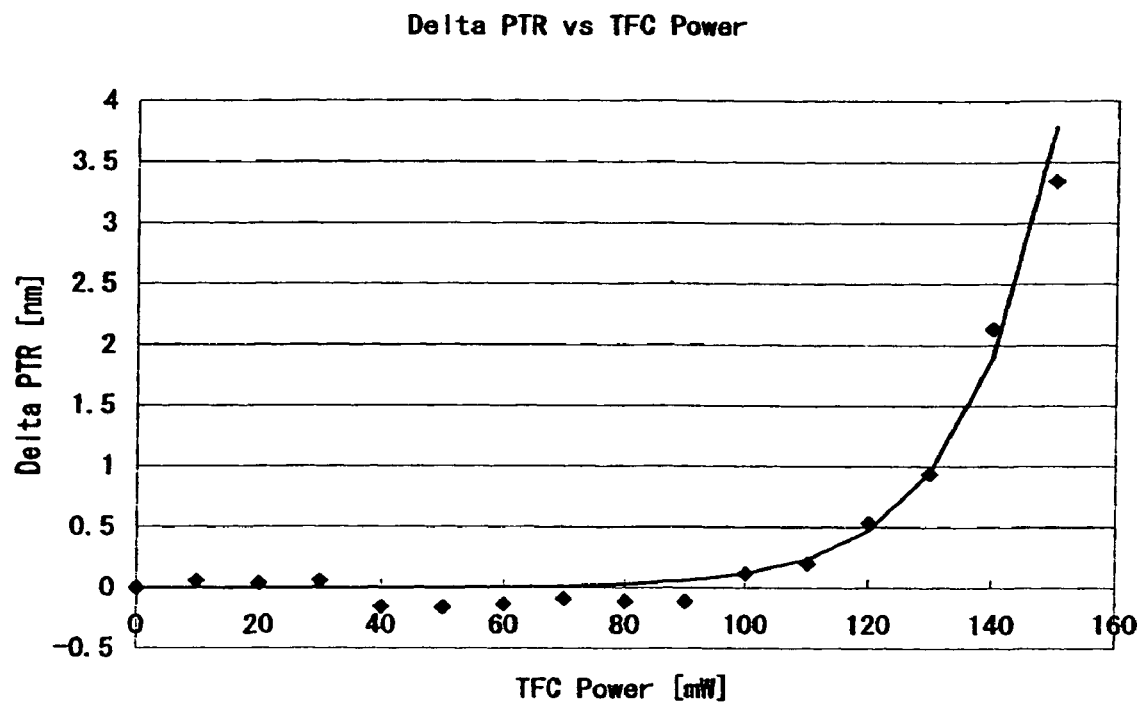
FIG. 8 shows measured results indicating the relationship between the heater power and the variation in static protruding amount (variation in recess depth) in one embodiment.

Next, a method for supplying heater power to cause plastic deformation of the head element portion 122 will be described. FIG. 8 shows measured results indicating the relationship between the heater power and the variation in static protruding amount (variation in recess depth) caused by plastic deformation. The static protruding amount is the protruding amount at the heater OFF and is the protruding amount from the initial state before plastic deformation. The maximum heater power value Pmax of the head slider used in the measurement was 150 mW. The Y axis represents the protruding amount of the head element portion from the initial position and the increment corresponds to the decrement in the recess depth. The X axis represents the heater power, and the supply time of each heater power is 30 seconds.

When a heater power more than 100 mW is supplied, the head element portion 122 undergoes plastic deformation to increase the static protruding amount (decrease the recess depth). When the heater power exceeds the 120 mW, the static protruding amount increases (the recess depth decreases) drastically. The relationship between the variation in static protruding amount and the supplied heater power can be approximated by an exponential. Although the static protruding amount decreases at some of the heater powers in the graph of FIG. 8, the decreases result from measurement errors.

Figure 9:
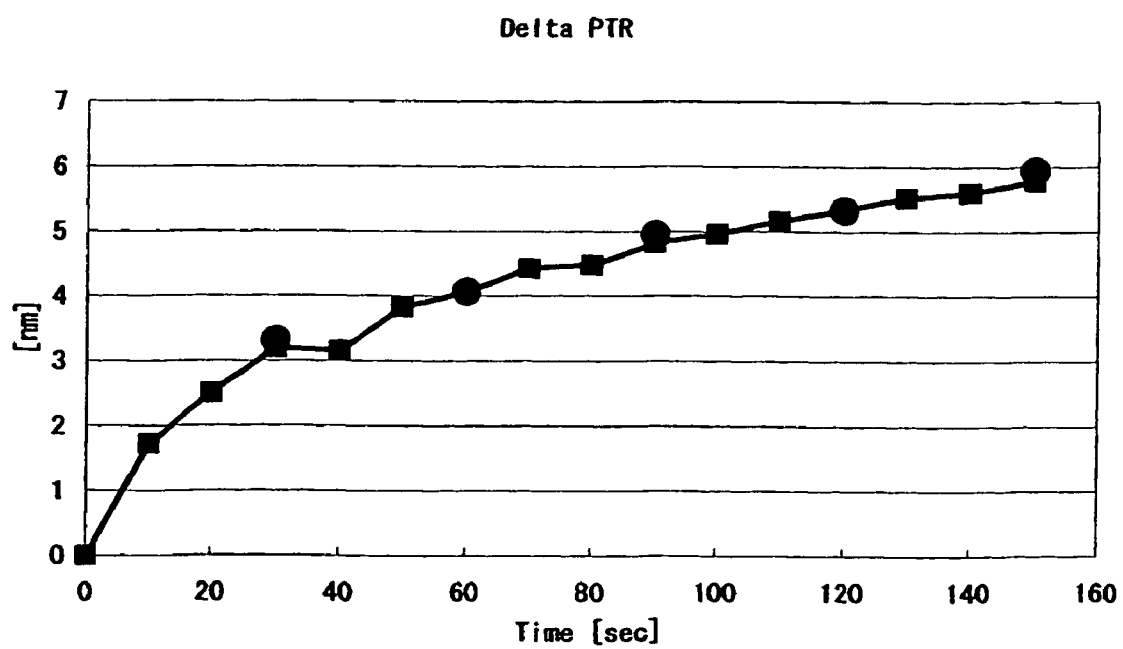
FIG. 9 shows measured results indicating the relationship between the heater power supply time and the variation in static protruding amount (variation in recess depth) in one embodiment.

FIG. 9 shows measured results indicating the relationship between the heater power supply time and the variation in static protruding amount (variation in recess depth) caused by plastic deformation. The measurement supplied 150 mW of power to a head slider 12 and measured the variation in static protruding amount (recess depth) corresponding to the supply time. With respect to the data represented by ●, the measurement repeated an application of 150 mW of heater power for 30 seconds and a measurement of static protruding amount (recess depth); the data represented by ● indicate variation in the static protruding amount (recess depth) after 30 seconds, 60 seconds, 90 seconds, 120 seconds, and 150 seconds.

In contrast, the data represented by ■ each indicate measured results of variation in static protruding amount (variation in recess depth) for the total supply time of heater power, repeating ON and OFF of the heater 124. Specifically, the measurement supplied 150 mW of heater power for 10 seconds and measured a static protruding amount (recess depth), and repeated the same heater power supply and measurement. The supply time of heater power before each measurement is 10 seconds; for example, the total supply time of heater power at the third measurement is 30 seconds.

As understood from the graph of FIG. 9, the variation in static protruding amount (variation in recess depth) when heater power has been supplied for continuous T seconds and the variation in static protruding amount (variation in recess depth) when a plurality of times of heater power have been supplied for T seconds in total are substantially the same. This result enables the HDC/MPU 23 more easily to control heater power in adjusting the recess depth. The HDC/MPU 23 can easily estimate the variation in recess depth by measuring the total supply time even if the HDC/MPU 23 sequentially supplies heater power while changing the supply time in order to gradually decrease the recess depth. Moreover, in a process repeating plastic deformation for a plurality of times as in the example explained in reference to the flowchart of FIG. 7, the HDC/MPU 23 can easily estimate the variation in recess depth.

Figure 7:
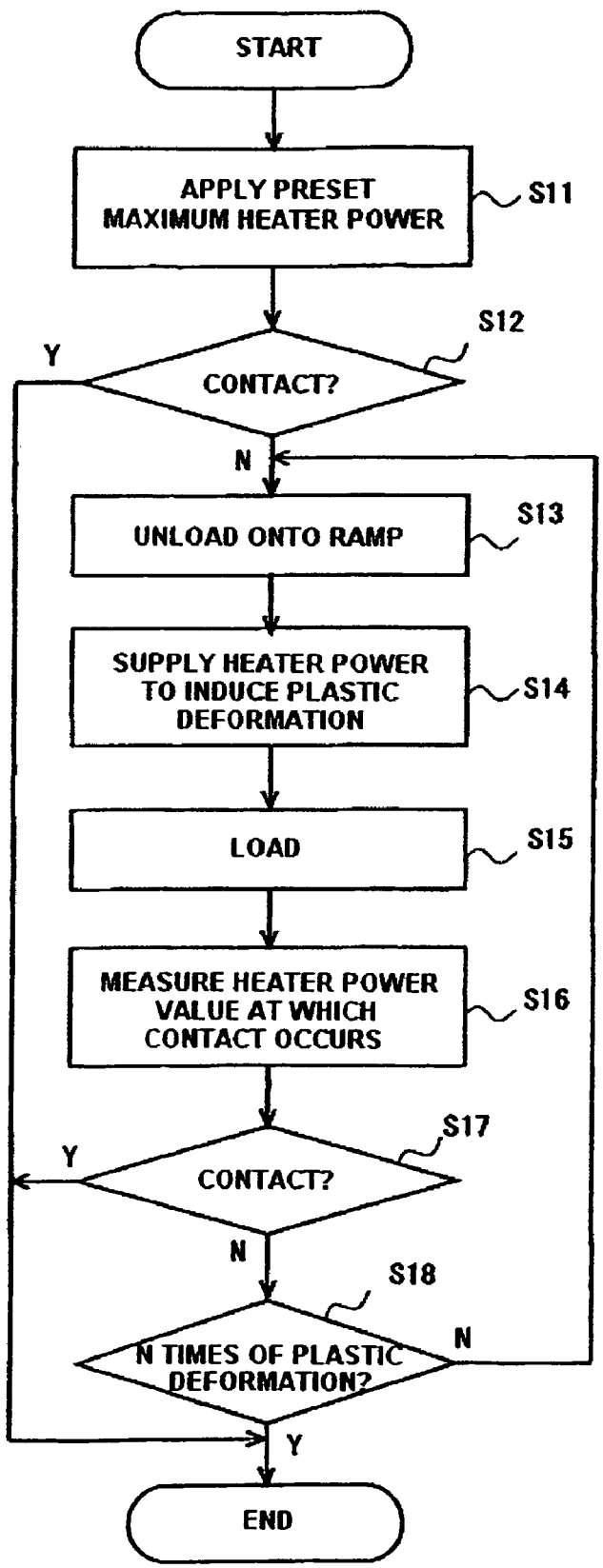
FIG. 7 is a flowchart illustrating an example of adjusting the recess depth of a head element portion in measuring TDP in one embodiment.

In adjusting the recess depth in the process explained in reference to FIG. 7, an example of the method for supplying heater power supplies heater power for plastic deformation so that the adjusted initial clearance will be a reference value or more. The HDC/MPU 23 cannot increase the adjusted recess depth because the shape of the head plastic-deformed by the heater cannot be returned to the original shape. A too small recess depth (initial clearance) increases the possibility of contact between the head element portion 122 and the magnetic disk 11. From this point of view, the above method can prevent the plastic deformation from decreasing the recess depth too much.

One value for the reference can be a nominal initial clearance of a head slider 12. The nominal value is determined in designing the HDD 1, for example. In this instance, the initial clearance and the TDP have a substantially proportional relationship; the initial clearance is expressed by the heater power amount of TDP. For example, assuming the nominal TDP is 80 mW and the preset heater power maximum value Pmax is 150 mW, the HDC/MPU 23 supplies heater power for plastic deformation so that the initial clearance after adjusting the recess depth will be the nominal value or more.

If contact has not been detected at the heater power of 150 mW, the difference between the nominal initial clearance and the initial clearance of the subject head slider 12 is over 70 mW, which is the difference between the heater power maximum value Pmax of 150 mW and the nominal TDP of 80 mW. Therefore, the HDC/MPU 23 supplies the head slider 12 on the ramp with the heater power corresponding to the variation in recess depth of 70 mW. Setting the initial clearance to the nominal value or more can prevent contact of a head slider to a magnetic disk even if the fly-height of the head slider drastically varies due to an impact shock or the like. Further, if a single adjustment has defined the recess depth at a value not less than the reference value and has set to be able to detect contact, the process time can be shortened.

The HDC/MPU 23 preliminary obtains the heater power value corresponding to the recess depth at 70 mW from a test computer. The nominal value may be updated as needed in a test step of the HDD 1. The test computer obtains TDPs every time a test of the HDD 1 ends and calculates the average, which should be the nominal value. The test computer calculates the heater power value for adjusting the recess depth from the updated nominal value and transfers the value to the HDD 1 before the test of the HDD 1.

Another reference value for determination of heater power in adjusting the recess depth may be the lower limit of the initial clearance. The lower limit can be determined in designing the HDD 1. For example, assume the nominal TDP is 80 mW and the lower limit of the TDP is 40 mW following the above example. A head slider 12 with TDP of less than 40 mW is determined to be a failure.

The HDC/MPU 23 supplies heater power for plastic deformation so that the initial clearance after adjusting the recess depth will be not less than the lower limit. If contact has not been detected at 150 mW of heater power, the difference between the lower limit for the recess depth of 40 mW and the recess depth in the subject head slider 12 is more than 110 mW, which is the difference between 150 mW and 40 mW. Accordingly, the HDC/MPU 23 supplies the head slider 12 on the ramp with heater power corresponding to the recess depth at 110 mW. Setting the initial clearance to not less than the lower limit increases the possibility to set the initial clearance to between the heater power maximum value Pmax and the lower limit. Then, the process time can be shortened because a single adjustment can finish the adjustment of the recess depth.

In the above example, the HDC/MPU 23 adjusts the recess depth to measure the TDP. However, the HDC/MPU 23 can adjust the recess depth more precisely. The initial clearance of a head slider 12 has a proper value. If the initial clearance of the measured head slider 12 is larger than the proper value, adjusting the recess depth can bring the initial clearance close to the proper value. In this case, the HDC/MPU 23 adjusts the recess depth if the difference between the proper value and the current recess depth exceeds a threshold, and it does not adjust the recess depth if the difference between the current recess depth and the proper value is within a threshold range or substantially the same.

The HDC/MPU 23 preliminarily downloads the data indicating the relationship between the variation in the recess depth to be adjusted by plastic deformation and the value and supply time of heater power to be supplied from a test computer. The HDC/MPU 23 calculates the difference between the optimum TDP and the measured TDP from the measurement of the TDP. The variation in the recess depth by plastic deformation corresponds to this difference expressed in heater power. The HDC/MPU 23 determines the value and the supply time of heater power to be supplied to a head slider 12 for adjusting the recess depth from the calculated difference and the data and supplies the heater power to the heater 124. The heater power to be supplied may be constant or varied with time.

Figure 10:
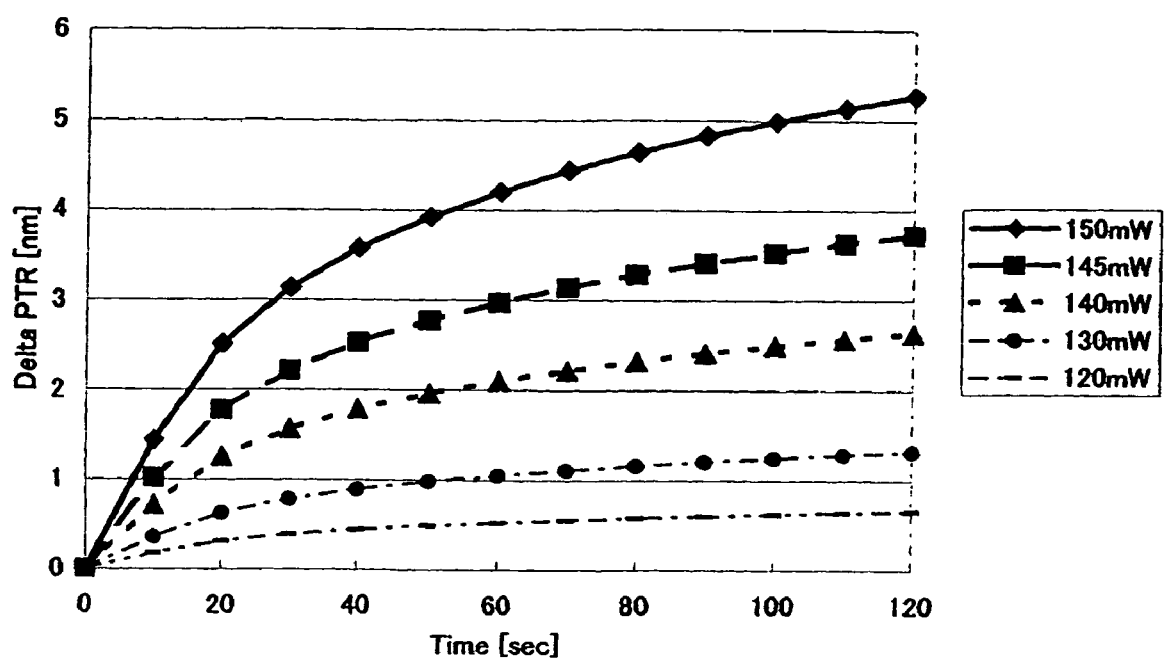
FIG. 10 shows measured results indicating the relationship between the supply time at each heater power value and the protruding amount in one embodiment.

FIG. 10 represents the relationship between the supply time of each heater power value and the protruding amount. As shown in measured data in FIG. 10, the recess depth varies drastically as soon as the supply of heater power is started and then varies slowly. As the heater power is smaller, a region exhibiting drastic variation is smaller and the variation is gentle, but the maximum value (saturated value) of the protruding amount is smaller.

In order to adjust the recess depth accurately, the region exhibiting drastic variation can be avoided. On the other hand, the time for adjusting the recess depth can be short. Therefore, the heater power value can be varied in accordance with the recess depth adjustment amount by plastic deformation. Specifically, a heater power value selected from the preset heater power values can be supplied. The selected heater power value can be the largest one of the heater power values at which the variation in the protruding amount per supply time around the adjustment amount is within a specific range. It is acceptable to supply a small heater power value if the adjustment amount is small and to supply a large heater power value if the adjustment amount is large. In this way, varying the heater power amount in accordance with the amount to be adjusted by plastic deformation achieves adjustment without using the heater power in the region where the recess depth drastically varies so that the recess depth can be adjusted accurately.

Figure 11:
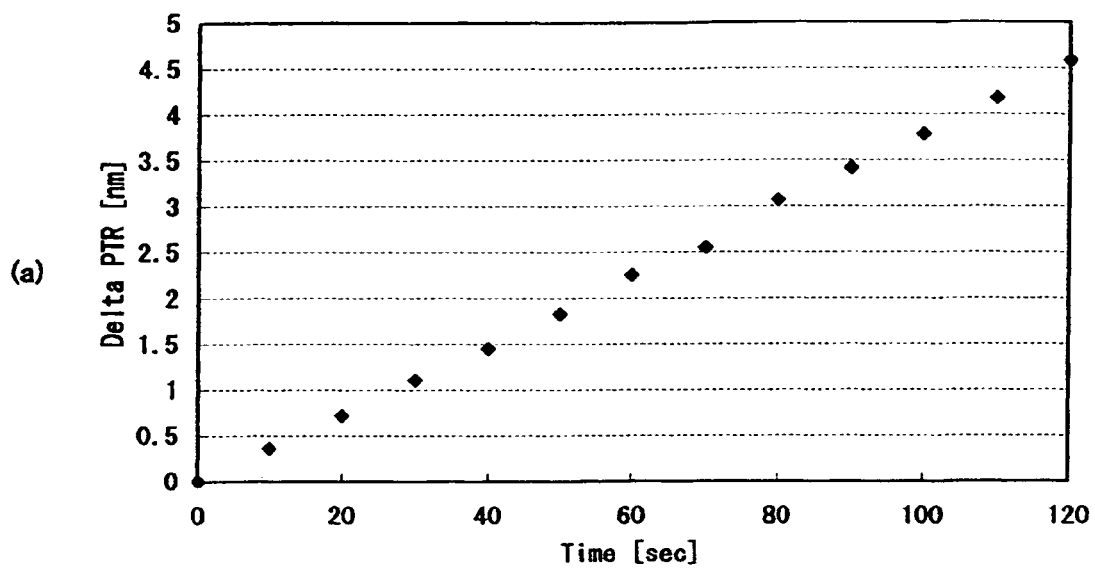
FIGS. 11(a) and 11(b) show an example of a method for supplying heater power depending on the adjustment amount for the recess depth.
Figure 11:
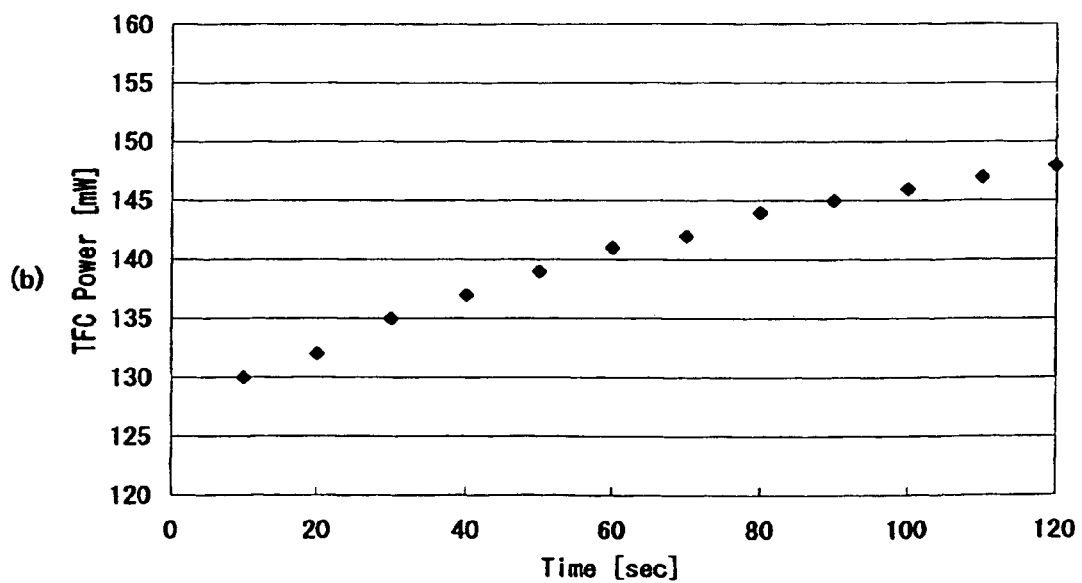

FIGS. 11(a) and 11(b) illustrate an example of a preferable method for supplying heater power corresponding to the recess depth to be adjusted. FIGS. 11(a) and 11(b) are based on data obtained through actual measurement. The HDC/MPU 23 downloads data corresponding to FIGS. 11(a) and 11(b) from a test computer before a test. The data to be downloaded are functions or tables indicating the relationships in FIGS. 11(a) and 11(b).

In FIG. 11(a), the Y axis represents variations in the recess depth to be adjusted (variations in protruding amount by plastic deformation) and the X axis represents the heater power supply time corresponding to each variation in the recess depth. For example, if the recess depth is adjusted by 2.5 nm, the HDC/MPU 23 supplies heater power for 70 seconds. The recess depth adjustment amount has a linear relationship with the heater power supply time.

The heater power is determined from the graph in FIG. 11(b). In FIG. 11(b), the Y axis represents heater power supply time and the X axis represents heater power values corresponding to the heater power supply time. For example, if the heater power supply time is 70 seconds, the HDC/MPU 23 supplies 142 mW of heater power. Since the heater power value increases as the recess adjustment amount increases, more accurate adjustment of recess depth can be available. When increasing heater power with the recess depth adjustment amount, the heater power may be increased step by step rather than continuously.

Next, the condition of the head slider after performing a method of one embodiment will be described. Since the head element portion has undergone plastic deformation as described above, the protruding amount varies. Since a heater for normal TFC supplies the head element portion with large heat to cause plastic deformation, a protruding part is formed on the ABS of the slider in the vicinity of the surface on which the slider contacts the head element portion, although the protruding amount is smaller than the plastic deformation amount of the head element portion.

In the above example, the HDD 1 itself adjusts the recess depth in a test step of the HDD 1. Being different from this, the recess depth may be adjusted in a manufacturing step of a head slider 12. Adjusting the recess depth in the manufacturing step of a head slider allows separation of defective units from non-defective units before mounting the head slider on an HDD so that only acceptable head sliders can be transferred to the fabricating step of the HDD. In another example, the recess depth may be adjusted before and after mounting head sliders on the HDD. In manufacturing a head slider 12, power is supplied to the heater 124 of the head slider 12 to adjust the recess depth by plastic deformation. In this instance, the heater is not limited to the heater used in the TFC for adjusting the clearance to the magnetic disk 11. The recess depth may be adjusted at any time, but typically, the recess depth is adjusted by plastic deformation only when the recess depth does not satisfy the predetermined condition.

For example, when a row bar constituted by a row of plural head sliders has been prepared, the recess depths of the head sliders 12 are measured by an optical means. If their recess depths are larger than the preset threshold, power is supplied to the heaters 124 of head sliders 12 to adjust the recess depths of the head element portions by plastic deformation. Typically, the recess depths of head sliders 12 in a row bar are substantially the same. Accordingly, measurement may be made on a recess depth of one of the head sliders 12 selected from the row bar and may supply the same heater power to all the head sliders 12 in accordance with the measured value.

Or, the recess depth may be adjusted in a dynamic electric test in manufacturing a head slider 12. The dynamic electric test conducts a simple read/write test with a head slider 12 actually flying over a magnetic disk 11 for a test. If the dynamic electric test has determined the recess depth to be more than a threshold, it adjusts the recess depth. Such adjustment of the recess depth can be performed before mounting the head slider 12 onto the HDD 1 and further adjustment of the recess depth can be performed in the test step of the HDD 1. This accomplishes more accurate clearance control.

As set forth above, the present invention has been described by way of particular embodiments but is not limited to the above embodiment. A person skilled in the art can easily modify, add, and convert each element in the above embodiments within the scope of the present invention. Embodiments of the present invention may be applied to an HDD mounting a head slider with only a read element or a disk drive device other than an HDD. The recess depth may be adjusted at start-up of an HDD or during idling after products delivery.

What is claimed is:

1. A method comprising:
    supplying power to a single heater in a head slider having a head element portion formed on a trailing-side end surface of the slider and including the heater;
    expanding the head element portion by heat from the single heater to which the power has been supplied; and
    decreasing a recess depth of the head slider by plastic deformation of the head element portion induced by the expansion to adjust the recess depth,
    wherein the single heater adjusts a protruding amount of the head element portion at the time of an access.

2. The method according to claim 1, further comprising:
    determining whether or not the head element portion satisfies a preset condition; and
    decreasing the recess depth by the plastic deformation if the recess depth does not satisfy the preset condition.

3. The method according to claim 2, wherein the head slider is unloaded and power is supplied to cause plastic deformation of the head element portion.

4. The method according to claim 3, wherein the preset condition is a condition that an initial clearance between the head element portion and a disk is smaller than a threshold in the disk drive device.

5. The method according to claim 3, wherein the preset condition is a condition that contact between the head slider and the disk is detected at a preset heater power value in a test of the disk drive device.

6. The method according to claim 2, wherein power for the plastic deformation is supplied so that an initial clearance between the head element portion and the disk after adjusting the recess depth becomes larger than a reference value.

7. The method according to claim 6, wherein the reference value is a preset nominal value or a preset lower limit value.

8. The method according to claim 1, wherein:
    a heater power value is selected from a plurality of preset heater power values and supplied; and
    the selected heater power value is the largest heater power value of the heater power values at which the variation in the protruding amount per supply time around the adjustment amount is within a specific range.

9. The method according to claim 1, further comprising:
    varying a plastic deformation amount in accordance with a clearance between the head element portion and the disk before the plastic deformation; and
    increasing the power with increase in the plastic deformation amount.

10. A method comprising:
    supplying power to a heater in a head slider having a head element portion formed on a trailing-side end surface of the slider and including the heater;
    expanding the head element portion by heat from the heater to which the power has been supplied; and
    decreasing a recess depth of the head slider by plastic deformation of the head element portion induced by the expansion to adjust the recess depth, wherein the recess depth of the head slider is adjusted before mounting the head slider on a disk drive device.

11. A disk drive device comprising:
    a head slider comprising a slider and a head element portion formed on a trailing-side end surface of the slider, and including a heater for adjusting a protruding amount of the head element portion at a time of an access;
    a moving mechanism for supporting the head slider and moving the head slider above a disk;
    a ramp being a retract position of the moving mechanism; and
    a controller for controlling heater power supplied to the heater when the moving mechanism is on the ramp so that the head element portion undergoes plastic deformation.

12. The disk drive device according to claim 11, wherein the controller determines whether or not the head element portion satisfies a preset condition, and causes plastic deformation of the head element portion if a recess depth does not satisfy the preset condition.

13. The disk drive device according to claim 12, wherein the preset condition is a condition that an initial clearance between the head element portion and a disk is smaller than a threshold in the disk drive device.

14. The disk drive device according to claim 12, wherein the preset condition is a condition that contact between the head slider and the disk is detected at a preset heater power value in a test of the disk drive device.

15. The disk drive device according to claim 11, wherein the controller controls power for the plastic deformation so that an initial clearance between the head element portion and the disk after adjusting the recess depth becomes larger than a reference value.

16. The disk drive device according to claim 15, wherein the reference value is a preset nominal value or a preset lower limit value.

17. The disk drive device according to claim 11, wherein the controller controls selecting a heater power value from a plurality of preset heater power values and supplied; the selected heater power value is the largest heater power value of the heater power values at which the variation in the protruding amount per supply time around the adjustment amount is within a specific range.

18. The disk drive device according to claim 11, wherein the controller controls varying a plastic deformation amount in accordance with a clearance between the head element portion and the disk before the plastic deformation and increasing the power with increase in the plastic deformation amount.

* * * * *